(12) United States Patent
Jamet et al.

(10) Patent No.: US 7,082,241 B2
(45) Date of Patent: Jul. 25, 2006

(54) OPTICAL FIBER CABLE WITH RETAINING SHEATH

(75) Inventors: Patrick Jamet, Marolles sur Seine (FR); Nathalie Lecourtier, Villeblevin (FR); Daniel Bernier, Voulx (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 11/165,920

(22) Filed: Jun. 24, 2005

(65) Prior Publication Data

US 2005/0238300 A1    Oct. 27, 2005

Related U.S. Application Data

(63) Continuation of application No. PCT/FR03/03920, filed on Dec. 26, 2003.

(30) Foreign Application Priority Data

Jan. 9, 2003    (FR) .................................... 03 00204

(51) Int. Cl.
*G02B 6/44*    (2006.01)
(52) U.S. Cl. ........................ 385/109; 385/100; 385/110
(58) Field of Classification Search ................ 385/104, 385/100, 110
See application file for complete search history.

(56) References Cited

U.S. PATENT DOCUMENTS 4,740,053 A * 4/1988 Cassidy ...................... 385/102
5,155,789 A    10/1992 Le Noane
6,398,190 B1    6/2002 Li

FOREIGN PATENT DOCUMENTS

| | | | |
|---|---|---|---|
| DE | 3624514 A | * | 1/1988 |
| EP | 0 296 836 A | | 12/1988 |
| EP | 296836 A | * | 12/1988 |
| EP | 0 468 878 A1 | | 1/1992 |
| EP | 0 901 028 A1 | | 3/1999 |
| FR | WO 9913368 A | * | 3/1999 |
| GB | 2065324 A | * | 6/1981 |
| JP | 07270653 A | * | 10/1995 |
| JP | 11 311727 | | 11/1999 |
| JP | 11311727 A | * | 11/1999 |
| JP | 2000 329982 | | 11/2000 |
| WO | WO 98/21615 | | 5/1998 |
| WO | WO 00/29892 A | | 5/2000 |
| WO | WO 02/31568 A1 | | 4/2002 |
| WO | WO 03/021324 A1 | | 3/2003 |

* cited by examiner

*Primary Examiner*—Kaveh Kianni
(74) *Attorney, Agent, or Firm*—Lawrence E. Laubscher, Sr.; Lawrence E. Laubscher, Jr.

(57) ABSTRACT

A telecommunication cable of the microcable or minicable type having optical fibers (2) contained in a thin retaining sheath (3) includes an external layer (4) extending concentrically around the retaining sheath. The external layer has a friction coefficient lower than that of the retaining sheath and a stiffness greater than that of the retaining sheath. These characteristics reduce friction and increase the stiffness of the cable when the latter is installed by blowing or floating in a conduit.

19 Claims, 3 Drawing Sheets

OPTICAL FIBER CABLE WITH RETAINING SHEATH

CROSS REFERENCE TO RELATED APPLICATION

This application is a continuation of the PCT International Application No. PCT/FR03/03920 filed Dec. 26, 2003, which is based on the French Application No. 0300204 filed Jan. 09, 2003.

BACKGROUND OF THE INVENTION

1. Field of the Invention

The present invention relates to an optical fiber telecommunication cable, in particular for connecting user telecommunication installations to switching and routing centers.

2. Description of the Related Art

For reasons of economy, the connection of user installations by optical fibers is carried out at the request of the users, use being made of individual microconduits or miniconduits that are allocated to respective users. The telecommunication operator managing these user connection lines connects only those users that request this connection. This is more economical than prior precabling systems that include potentially "connectable" user installations without being certain which users would be interested in having a connecting line employing one or more optical fibers.

In a prior art user line concentration embodiment shown in FIG. 1, individual microconduits or miniconduits MCO dedicated respectively to users or groups of users are contained together within an existing conduit CD in order to reduce the civil engineering cost of installing user lines. Each microconduit or miniconduit MCO contains a microcable or minicable MCA dedicated to a user or a group of users and installed at the request of the user or the group of users. FIG. 1 shows two microcables or minicables and five microconduits or miniconduits MCO that are awaiting the installation of microcables or minicables.

A sheath G may clothe the assembly of microconduits or miniconduits MCO to constitute a "multimicroconduit" or "multiminiconduit" system, as shown in FIG. 1.

The microconduits typically have an inside diameter lying between 3 mm and 5 mm and an outside diameter lying between 5 mm and 8 mm and each comprises a microcable having an outside diameter of less than or equal to 3 mm, generally from 0.8 mm to 2 mm. Miniconduits and minicables have larger sections than microconduits and microcables. Miniconduits typically have an inside diameter lying between 6 mm and 12 mm and an outside diameter lying between 8 mm and 15 mm. Minicables have an outside diameter less than or equal to 11 mm, generally from 3 mm to 10 mm.

Because of the small sections of microcables, minicables, microconduits and miniconduits, each microcable in a microconduit or each minicable in a miniconduit is generally installed by a blowing or floating technique.

FIG. 2 shows diagrammatically the installation of a microcable or minicable MCA in a microconduit or miniconduit MCO using a blowing technique. The microcable or minicable MCA is unwound from a drum R around which the microcable or minicable is loosely wound in the form of a spool and which turns freely about the axis of a support SU placed on the ground. A free end of the microcable or minicable MCA is fitted with a core OB having a section substantially smaller than that of the microconduit or miniconduit MCO. The microcable or minicable is paid out from the drum R and pulled longitudinally along the microconduit or miniconduit by the core, in the direction of the arrow FT, by virtue of the thrust exerted on the rear of the core OB by a flow of compressed air AC.

FIG. 3 shows diagrammatically the installation of a microcable or minicable MCA in a microconduit or a miniconduit MCO using a floating technique. The minicable or microcable is paid out from a drum R mounted freely on a support SU resting on the ground by two rollers RO turning in opposite directions that push the microcable or minicable MCA into the microconduit or miniconduit MCO. A fluid FL such as air or water injected under pressure into the microconduit or the miniconduit MCO allows the microcable or minicable to "float" in the microconduit or miniconduit at the same time as being pushed by the two rollers RO. This floating technique applies much lower mechanical stresses to the microcable or minicable than the blowing method shown in FIG. 2.

Optical fiber telecommunication minicables and microcables respectively intended to be installed in miniconduits and microconduits comprise a thin retaining sheath that offers a relatively high coefficient of friction in respect of hard plastic material microconduits and miniconduits. Consequently the retaining sheath has braking effect relative to the forward movement of the microcable or minicable in the microconduit or miniconduit by blowing in compressed air or by flotation in a fluid and pushing by rollers.

Moreover, the retaining sheath offers a low stiffness which causes the microcable or minicable to buckle, an effect which becomes more accentuated as the length of the microconduit or miniconduit increases. Any exaggerated pushing of the retaining sheath against the wall of the microconduit or miniconduit brakes forward movement of the microcable or minicable.

SUMMARY OF THE INVENTION

The main object of the present invention is to reduce the friction on an optical fiber cable when installed in a conduit, in particular by a blowing or floating technique, whilst preserving the cohesion of the diverse members of the cable and a highly compact cable, and without degrading transmission quality and the service life of the optical fibers in the cable.

To achieve the above objective, a telecommunication cable having optical fibers contained in a thin retaining sheath is characterized in that it comprises an external layer around the retaining sheath having a coefficient of friction lower than that of the retaining sheath.

Since the external layer is the member of the cable that may be in direct contact with the wall of a microconduit or miniconduit, reducing the coefficient of friction of the cable by choosing a coefficient of friction of the external layer lower than that of existing retaining sheaths reduces the traction forces exerted on the cable during installation by a blowing or floating technique.

As will emerge hereinafter, the thickness of the external layer is a few tens of millimeters and thus of the same order as the thickness of the retaining sheath, which produces a very compact cable. The cable is even more compact if the optical fibers are clamped in the retaining sheath by mechanical coupling with the latter or by way of retaining sheaths enclosing optical fiber modules and by mechanical coupling of the external layer and the retaining sheath surrounded by the external layer.

A second object of the invention is to increase the stiffness of the optical fiber telecommunication cable in order to facilitate the linear retention of the cable in a microconduit or a miniconduit over a distance from tens to hundreds of meters, at the same time as avoiding curvatures or bendings of the assembly comprising the retaining sheath and the external layer leading to a bunching effect. To this end, the stiffness of the external layer is greater than the stiffness of the retaining sheath surrounded by the external layer.

It will be noted that merely replacing an external retaining sheath of a prior art minicable or microcable by an external layer according to the invention would bring the optical fibers into contact with a material that would be too stiff and hard, which would give rise to a risk of stressing of the optical fibers that could be reflected in mechanical damage of the optical fibers and/or degraded optical signal transmission performance in the optical fibers. The interposition of the retaining sheath between the optical fibers, or optical fiber modules, and the external layer according to the invention produces a damping effect for the optical fibers in relation to stresses exerted on the external layer.

BRIEF DESCRIPTION OF THE DRAWING

Other features and advantages of the present invention will become more clearly apparent on reading the following description of a plurality of preferred embodiments of the invention given with reference to the corresponding appended drawings, in which:

FIG. 2 shows diagrammatically an installation for installing a microcable in a microconduit or a minicable in a miniconduit using the prior art blowing technique already commented on;

FIG. 3 shows diagrammatically an installation for installing a microcable in a microconduit or a minicable in a miniconduit using the prior art floating technique already commented on;

DETAILED DESCRIPTION

Figure 4:
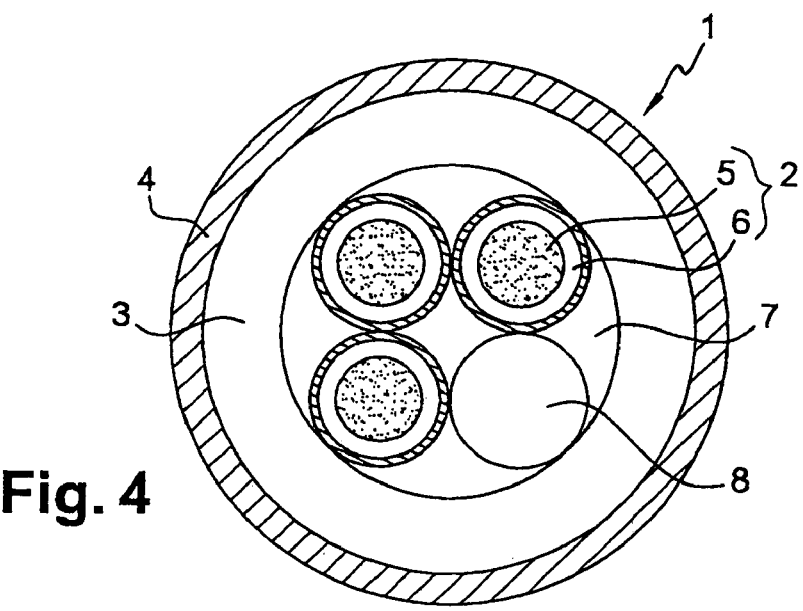
FIG. 4 is a view in section to a very large scale of a microcable of the invention with three optical fibers and one mechanical reinforcing fiber.

Referring to FIG. 4, a telecommunication microcable 1 according to the invention essentially comprises a plurality of optical fibers 2, a retaining sheath 3, and an external layer 4. Without the external layer, the minicable 1 is analogous to a module, also known as a micromodule, surrounded by the thin and easily torn retaining sheath 3 and containing a series of optical fibers, as disclosed in European patent EP-0468878.

Figure 1:
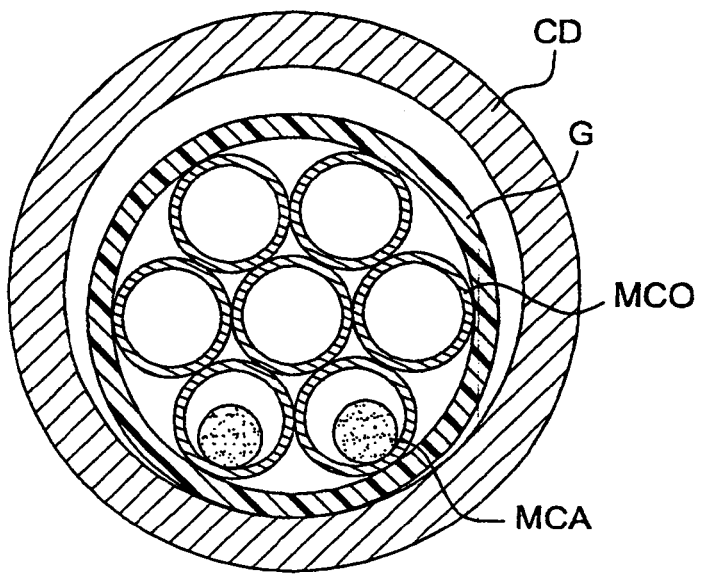
FIG. 1 is a section of a conduit in accordance with the prior art already commented on, containing seven microconduits or miniconduits, two of which each contain an optical fiber microcable or minicable.

Each optical fiber 2 typically comprises a silica core 5 having a section S1 with a diameter of approximately 0.125 mm and a colored identifying covering 6 having a thickness of 0.062 mm, i.e. an overall diameter of the optical fiber 2 of approximately 0.250 mm. The minicable 1 may comprise 2 to 12 optical fibers, for example, and the substantially oval or circular section of the minicable is adapted to the number of optical fibers. In order to avoid overcomplicating FIGS. 1, 3 to 4 optical fibers are shown inside the retaining sheath 3. The layers 6 of optical fibers are different colors so that they can be distinguished more easily when making a connection.

The retaining sheath 3, which is of the kind known as a "microsheath" (Registered Trade Mark "μgaine"), is thin and easily torn and is generally of substantially cylindrical shape, surrounding the optical fibers 2. The retaining sheath 3 clamps the optical fibers 2, of which there is a particular number, for example four, six, eight or twelve, to hold the optical fibers in groups and thereby constitute a compact module that is also known as a "micromodule". The retaining sheath 3 is in contact with and mechanically coupled to the optical fibers 2. In practice, if the number of optical fibers 2 contained in the retaining sheath 3 is relatively large, only the optical fibers on the outside of the module are in contact with the sheath 3.

The coupling between the optical fibers 2 and the retaining sheath 3 referred to above is defined as a mechanical coupling between two members, meaning that any stress applied to one of the members is transferred to the other member or that if one of the members is stressed the other is also stressed, without this necessitating any bonding or other fixing of one of the members to the other. For example, a traction force exerted on the retaining sheath 3 moves the optical fibers 2 contained in the retaining sheath in translation with it, and, conversely, a traction force exerted on the set of optical fibers moves the retaining sheath with said set of optical fibers; said traction forces are of course limited to the maximum permitted values before rupture for the cable members 2, 3 on which they are exerted. The mechanical coupling between the retaining sheath and the optical fibers ensures cohesion of the retaining sheath and the fibers that it contains and makes the module formed in this way very compact.

The retaining sheath 3 is relatively thin, having a thickness of the order of a few tenths of a millimeter, typically 0.25 mm. A microsheath used in practice in a telecommunication cable of the European patent cited above, i.e. 0.15 mm thick in practice, is therefore thinner than the retaining sheath 3 in a cable of the invention. The retaining sheath 3 with this thickness provides padding that damps any stresses exerted by the thinner external layer 4.

The retaining sheath 3 is adapted to the characteristics of the materials constituting the optical fibers that clamp them by mechanical coupling so that expansion and contraction forces caused by temperature variations are very much lower than stresses that could damage the optical fibers. The significantly low thickness of the retaining sheath avoids subjecting the fibers to elongation and compression stresses during thermal cycling.

The material of the retaining sheath 3 is typically an amorphous thermoplastic material, an elastomer, or a thermoplastic material that can contain mineral charges. The retaining sheath 3 is pretbrably extruded around the optical fiber module 2 at the same time as drawing and assembling the optical fibers 2, and where applicable is twisted in periodically alternating directions.

The interior of the retaining sheath 3 may be filled with a filling material 7, such as a silicone or synthetic gel, oil or grease, with which the optical fibers are coated before they are passed through an extrusion die for extruding the retaining sheath. The filling material 7 longitudinally seals the interior of the sheath.

Alternatively, the retaining sheath 3 encloses, in addition to the optical fibers 2, one or more mechanical reinforcing fibers 8, called stabilization fibers, as defined in International Patent Application No. WO 98/21615. In practice, the total number of reinforcing fibers 8 may be less than or equal to or greater than the total number of optical fibers 2 in a retaining sheath 3. The reinforcing fibers 8 have a diameter substantially equal to that of the optical fibers 2 and mechanical properties similar to the optical fibers, so that they are interchangeable with them. For example, the reinforcing fibers are glass, carbon or aramide fibers. The reinforcing fibers 8 are also mechanically coupled with the optical fibers 2 to the retaining sheath 3.

The reinforcing fibers have a coefficient of thermal expansion that is preferably less than or equal to that of the optical fibers. If the sheath 3 and the external layer 4 have a higher coefficient of thermal expansion than the optical fibers 2, the reinforcing fibers 8 preferably have a coefficient of thermal expansion lower than the combination of the retaining sheath 3 and the external layer 4, or even lower than the optical fibers, in order to offer some resistance to any variations in the length of the assembly 3-4, with the result that the overall thermal coefficient of the assembly 3-4 and the reinforcing fibers 8 is substantially equal to that of the optical fibers 2. The reinforcing fibers 8 provide longitudinal coupling with the assembly 3-4 in which the optical fibers and the reinforcing fibers are disposed with no overlength, i.e. with longitudinal coupling such that a mechanical or thermal stress stretching or compressing the assembly 3-4 leads to homogeneous stretching or compression of the assembly 3-4 and the optical fibers.

The retaining sheath 3 in the microcable 1 having N optical fibers 2 preferably has mechanical characteristics defined in relation to those of the optical fibers, in particular to prevent microcurvatures in the optical fibers if the minicable is subjected to temperature variations of approximately −40° C. to +85° C. To this end, according to International Patent Application No. WO 00/29892, the following condition must be satisfied:

$$(\alpha 3.E3.S3) \leq [(\alpha 5.E5.S5) + (\alpha 6.E6.S6)](N/14) + (\alpha 7.E7.S7)$$

in which $\alpha 3$, $E3$ and $S3$ denote a coefficient of thermal expansion/compression, a Young's modulus in tension, and a section of the retaining sheath 3, $\alpha 5$, $E5$ and $S5$ denote a coefficient of thermal expansion/compression, a Young's modulus in tension and a core section 5 of each optical fiber 2, $\alpha 6$, $E6$ and $S6$ denote a coefficient of thermal expansion/compression, a Young's modulus in tension and a section of the covering 6 of each optical fiber, and $\alpha 7$, $E7$ and $S7$ denote a coefficient of thermal expansion/compression, a Young's modulus in tension and a section of the filling material 7 corresponding to the area of the inside section of the retaining sheath 3 minus the sections of the optical fibers 2.

The retaining sheath 3 typically has a coefficient $\alpha 3$ of expansion/compression of less than approximately $80 \times 10^{-6}$/° C. for a temperature from −40° C. to +80° C., a Young's modulus in tension E3 of less than approximately 10 MPa, a thickness of less than approximately 0.35 mm, a Young's modulus in flexion of less than approximately 50 MPa, and a Shore D hardness of less than approximately 45.

Figure 2:
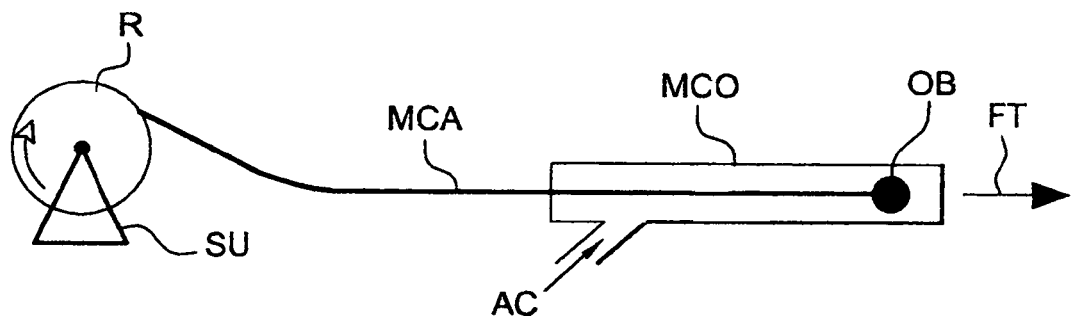
Figure 3:
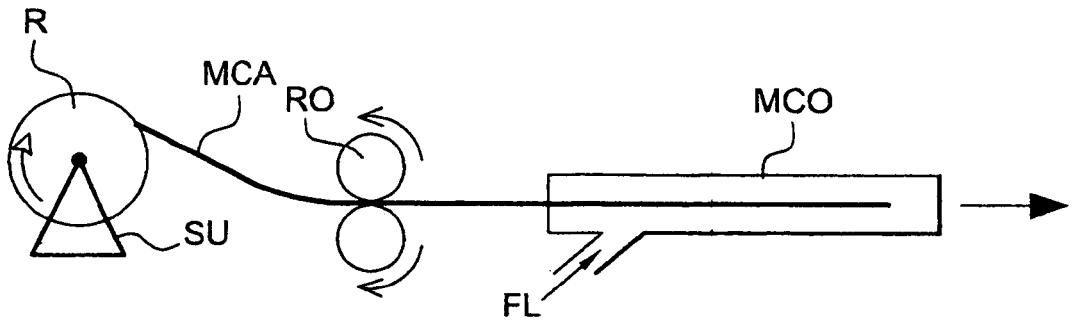

The external layer 4 of the invention has an extremely low coefficient of friction to limit the traction forces exerted on the microcable 1 when installing long lengths thereof in a microconduit MCO either by the blowing technique, as shown in FIG. 2, or by the technique of floating it in a fluid such as air or water under pressure, as shown in FIG. 3. The coefficient of friction of the external layer 4 is lower than approximately 0.060 so that the minicable slides virtually without friction inside a high-density polyethylene (PEHD) microconduit MCO. For example, the external layer is of a polyamide, or a polyester or a polyfluoroethylene such as polytetrafluoroethylene (PTFE). The coefficient of friction of the external layer 4 is much lower than that of the retaining sheath 3, which is typically of the order of 0.1 to 0.2, i.e. the coefficient of friction of the external layer 4 is at least substantially lower than half the coefficient of friction of the retaining sheath 3.

The coefficient of friction f of the external layer 4 of the microcable 1, i.e. the coefficient of friction of the microcable 1 as a whole, may be measured in the following manner (see FIG. 5).

Figure 5:
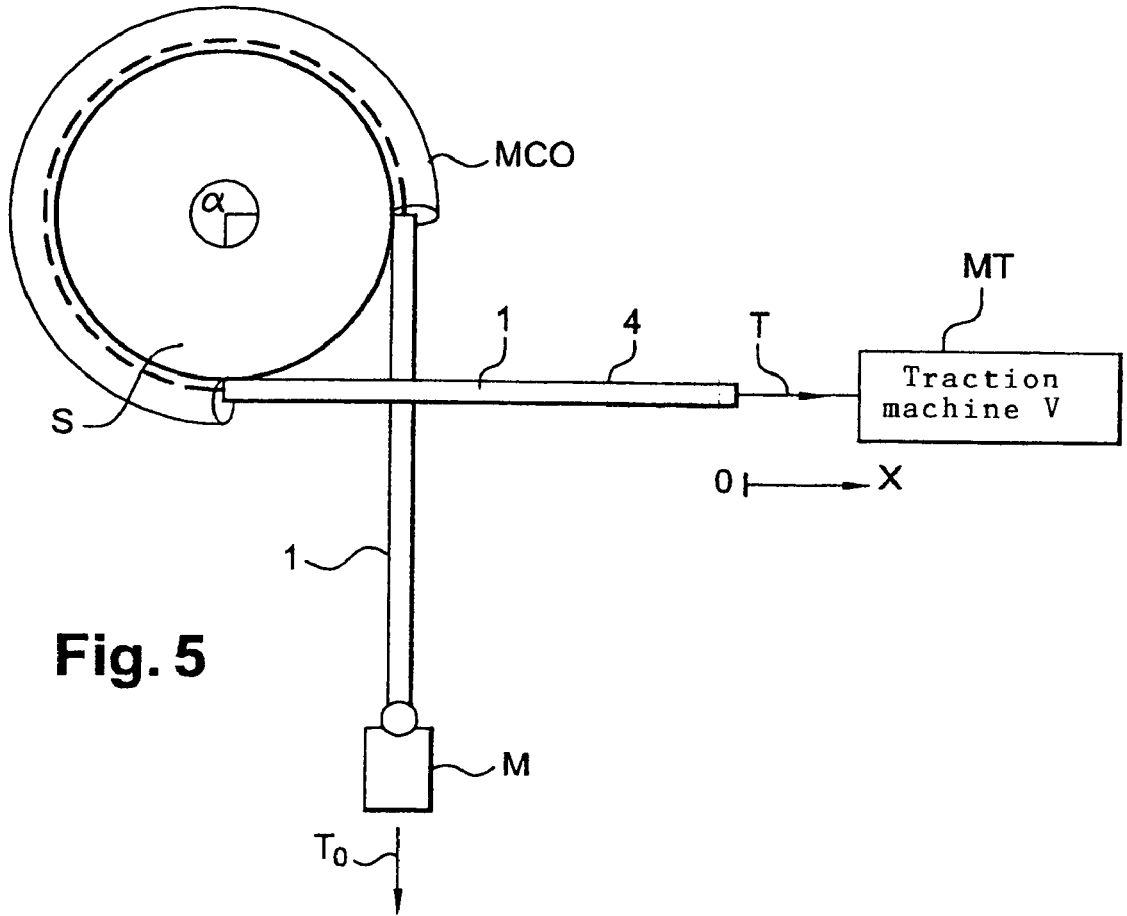
FIG. 5 shows diagrammatically an installation of the invention for measuring the coefficient of friction of a cable.

As shown in FIG. 5, 2.75 turns of a sample of circular smooth microconduit MCO made of high-density polyethylene with an inside diameter greater than the diameter of the microcable 1 is wound onto a 500 mm diameter rigid circular fixed support S. The inside and outside diameters of the microconduit MCO are typically 3.8 mm and 5.0 mm. After checking that the inside surface of the microconduit MCO is clean, dry, unlubricated and unmarked, a sample of microcable 1 including twelve optical fibers, for example, and having an outside diameter of 2.0 mm and a length of approximately 10 m is slid into the microconduit. An input tension $T_0 = 9.81 \times 0.2 = 1.962$ daN is applied to one end of the microcable sample using a mass M, typically of 200 g, fixed to that end and sufficient to press the sample of microcable 1 firmly onto the bottom of the microconduit MCO. The other end of the microcable sample is connected to a traction machine MT for applying a controlled traction force T.

Figure 6:
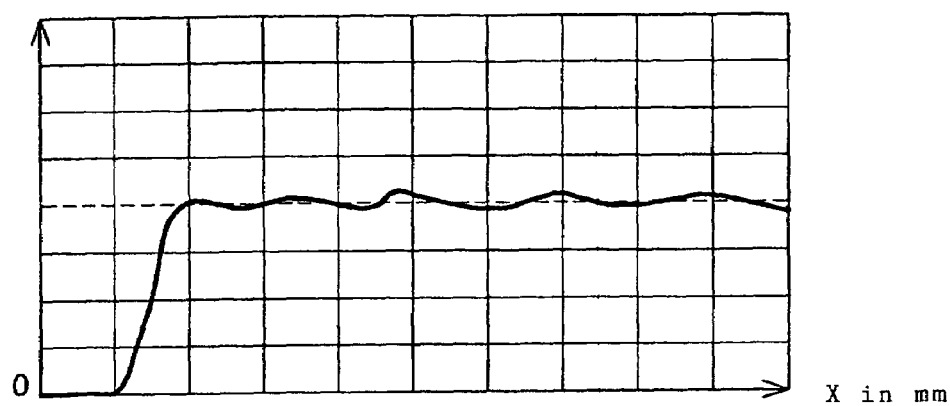
FIG. 6 is a chart representation of a traction force exerted on a cable sample in the FIG. 5 installation as a function of the displacement of the cable sample.

The test consists in pulling on the microcable sample at a predetermined rate V, typically of 1000 mm/min, set by the traction machine MT, and measuring the traction force T necessary for a displacement X of the microcable. The magnitude of the displacement is sufficient to establish a permanent displacement, and is typically of the order of 500 mm. FIG. 6 shows one example of a curve of the displacement X in millimeters plotted as a function of the traction force T in Newtons.

The coefficient of friction f is calculated from the measured traction force using the following formula:

$$f = (1/\alpha) \times ln(T/T_0), \text{ where:}$$

f=coefficient of friction,
ln=natural logarithm,
T=traction force in daN measured with a permanent displacement,
$T_0$=applied tension=$9.81 \times M$ (kg), and
α=friction angle in radians.

The thickness of the external layer 4 is low and much less than that of the retaining sheath 3. Materials with a low coefficient of friction being generally hard, or even rigid, the invention takes care to avoid all risk of any bunching effect on curvature or bending of the microcable.

The thickness of the layer 4 must nevertheless be sufficient to increase the stiffness of the microcable, but not too flexible, in order to enable installation of the microcable by the technique of floating it in a fluid, as shown in FIG. 3.

The thickness of the external layer 4 is typically lying between approximately 20 μm and approximately 100 μm for a Young's modulus in tension lying between approximately 40 MPa and approximately 100 MPa and for a Young's modulus in flexion lying between approximately 800 MPa and approximately 2500 MPa.

The hardness of the external layer 4 is greater than approximately 80 Shore D units, i.e. lying between approximately 100 and approximately 200 Rockwell R units. The external layer 4 is thus much harder than the retaining sheath 3, in a ratio of at least approximately 2:1.

Thus the stiffness of the external layer 4 is greater than the stiffness of the retaining sheath 3 in order to increase the stiffness of the microcable compared to a cable containing the same number of optical fibers 2 with only the microsheath 3.

Figure 7:
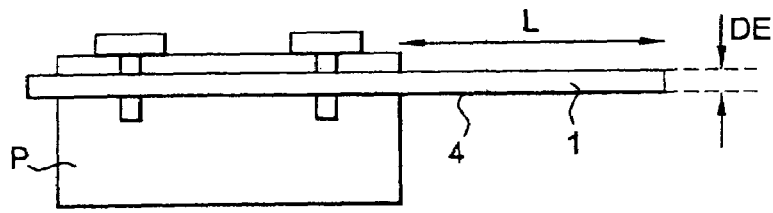
FIGS. 7 and 8 show diagrammatically a test installation for measuring the stiffness of an optical fiber cable respectively before and after one end of the cable is subjected to a predetermined bending force.
Figure 8:
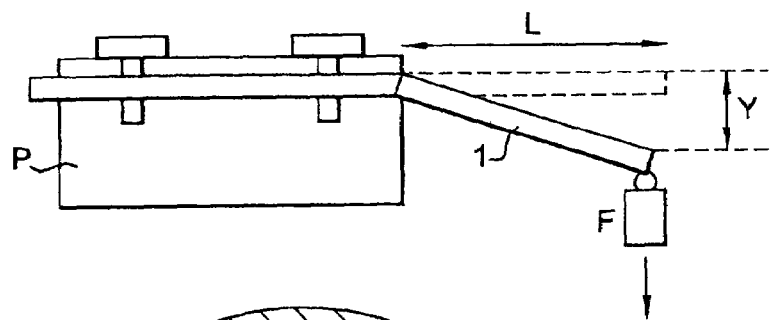

In reference to FIGS. 7 and 8, the stiffness of the microcable 1 is measured in the following manner. A sample of microcable 1 is fixed cantilever-fashion into a clamp P so that a predetermined length L of the sample projects from the clamp, as shown in FIG. 7. A vertical force F perpendicular to the sample is applied to the free end of the length L of the microcable sample and the resulting displacement Y is measured, as shown in FIG. 8. For example, the predetermined length L is 0.2 m and the applied force F is 0.08 N for a microcable with twelve optical fibers having an outside diameter DE of 2.0 mm.

The stiffness B of the microcable is expressed by the following formula:

$B=(L^3 \times F)/(3 \times Y)$, where:

F=force in Newtons,
L=cantilevered length of cable in m,
Y=displacement of the free end in m, and
B=stiffness in N.m².

The stiffness of the microcable 1 with the external layer 4 is typically greater than $2.6 \times 10^{-3}$ N.m², i.e. much greater than the stiffness of the retaining sheath 3. The stiffness B of the microcable 1 with the external layer 4 is approximately twice that of a prior art microcable with 12 optical fibers and a retaining sheath with no external layer.

With microcable members made of the same materials, the stiffness B is naturally dependent on the diameter of the microcable. According to the invention, the stiffness of the microcable corresponds to the following condition:

1053 $DE^2 - 1.6 \times 10^{-3} \leq B \leq 0.1$ N.m², where DE denotes the outside diameter in meters of the external layer 4 and therefore of the microcable 1. This condition results from installing a few microcables and minicables of the invention by blowing and by floating in a test microconduit.

The material of the external layer 4 preferably has a coefficient of thermal expansion/compression lying between approximately $100 \times 10^{-6}$/° C. and approximately $300 \times 10^{-6}$/° C. for temperatures from approximately −40° C. to approximately +80° C. The coefficient of expansion/compression of the complete microcable is not too increased by the external layer 4 thin compared to a prior art module with a retaining sheath, which imparts acceptable optical and thermal performance to the microcable.

More generally, at least one of the following characteristics of the external layer 4 is greater than that of the retaining sheath 3 surrounded by the external layer: Young's modulus in tension, Young's modulus in flexion, coefficient of expansion/compression and hardness.

The external layer 4 is extruded around the retaining sheath 3. The retaining sheath 3 and the external layer 4 are preferably extruded around the module consisting of the optical fibers 2 and, where applicable, mechanical reinforcing fibers 8. The retaining sheath 3 and the external layer 4 may be produced simultaneously with assembling the optical fibers 2 into a module. In order for the assembly 3-4 to clamp the set of optical fibers 2 and, where applicable, reinforcing fibers 8 and confer mechanical cohesion between the members 2, 3 and 4 and make the microcable 1 compact, the external layer 4 is mechanically coupled to the retaining sheath 3, where the expression "mechanical coupling" has the meaning defined hereinabove.

The mechanical coupling between the retaining sheath 3 and the external layer 4 prevents the retaining sheath from being subjected at low temperatures to compression and expansion that would be harmful if transmitted to the optical fibers 2; the harder and stiffer external layer 4 attenuates such stresses when, according to the invention, it is mechanically coupled to the optical fibers 2 via the retaining sheath 3. Furthermore, for installation by the floating technique (FIG. 3), the pusher rollers RO would tend to move the external layer 4 forward relative to the assembly 2-3 if the external layer 4 were not coupled to the retaining sheath 3.

Figure 9:
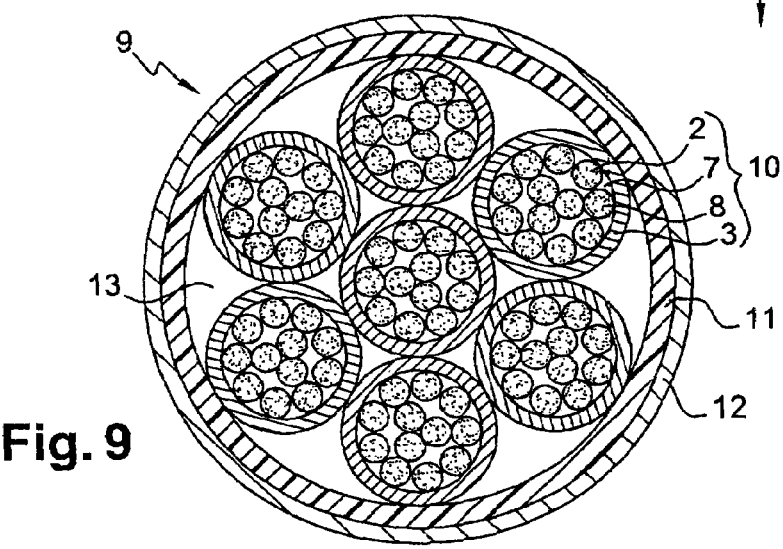
FIG. 9 is a view in section to a large scale of a minicable of the invention including seven modules each comprising twelve optical fibers and mechanical reinforcing fibers.

In a second embodiment of the invention, a telecommunication cable constitutes an optical fiber minicable 9 analogous to a supermodule as disclosed in International Patent Application No. WO 02/31568, but with an external layer conforming to the invention. The minicable 9 comprises a plurality of optical fiber modules 10, for example seven such modules, as shown in FIG. 9, and more generally at least two optical fiber modules 10. The relatively low number of modules 10 in the minicable 9 means that the modules can easily be distinguished from each other.

Each optical fiber module 10 constitutes a microcable analogous to that shown in FIG. 4, but with no external layer 4. Thus each module 10 comprises a plurality of optical fibers 2 each having a silica core 5 covered with a colored identification layer 6 and a "microsheath" type retaining sheath 3 that has low thickness, that is easy to tear and that is mechanically coupled to all of the optical fibers that it contains in order to clamp them. A module 10 comprises from two to twelve optical fibers, for example.

As in the first embodiment, shown in FIG. 4, a module 10 may contain a filling material 7 used as a sealing product and one or more mechanical reinforcing fibers 8, for example two reinforcing fibers per ten optical fibers per module. The filling material 7 fills all of the space between the optical fibers 2 and the mechanical reinforcing fibers 8, if any, in the retaining sheath 4.

In an analogous manner to the mechanical coupling and to the composition of the optical fibers 2 in a microcable 1 or a module 10, the minicable 9 comprises a retaining sheath 11 surrounding all the modules 10 contained in the minicable so as to group them together and hold them together. The retaining sheath 11 is in contact with the retaining sheaths 3 of the modules 10 that are on the outside of the minicable and is mechanically coupled to the retaining sheaths 3 of the modules 10 to clamp them. The mechanical coupling between the retaining sheaths 3 and the retaining sheath 11 must be of the kind defined hereinabove, i.e. such that any stress, such as traction, applied to the retaining sheath 11 of the minicable 9 is transmitted to the retaining sheaths 3 of the modules 10 and, conversely, any stress applied to the retaining sheaths 3 of the modules 10 is transmitted to the retaining sheath 11 of the minicable 9

The retaining sheath 11 of the minicable 9 has physical characteristics analogous to those of the retaining sheaths 3 of the modules 10, i.e. the retaining sheath 3 of the microcable 1. Thus the retaining sheath 11 has a Young's modulus in tension of less than approximately 10 MPa, a coefficient of thermal expansion/compression of less than approximately $80\times10^{-6}/°$ C. for a temperature lying between −40° C. and +80° C., a thickness lying between approximately 0.10 mm and approximately 0.50 mm, a Young's modulus in flexion of less than approximately 50 MPa, and a Shore D hardness of less than approximately 45.

The minicable 9 also comprises an external layer 12 that is mechanically coupled to the retaining sheath 11 of the minicable. The external layer 12 of the minicable 9 has physical characteristics analogous to those of the external layer 4 of the microcable 1. Thus the external layer 12 has a Young's modulus in tension lying between approximately 40 MPa and approximately 100 MPa, a coefficient of expansion/compression lying between approximately $100\times10^{-6}/°$ C. and approximately $300\times10^{-6}/°$ C. for a temperature from approximately −40° C. to approximately +80° C., a Young's modulus in flexion lying between approximately 800 MPa and approximately 2500 MPa, and a hardness of greater than approximately 45 Shore D units, i.e. lying between approximately 100 Rockwell R units and approximately 200 Rockwell R units. Furthermore, the external layer 12 has a coefficient of friction f of less than approximately 0.060. The minicable 9 has a stiffness B of greater than approximately $2.6\times10^{-3}$ N.m$^2$, typically a stiffness of $50\times10^{-3}$ N.m$^2$ for a minicable containing 144 optical fibers at the rate of twelve optical fibers 2 in each of twelve modules 10, for an outside diameter of the minicable 9 of 7.0 mm.

The outside diameter of the minicable 9 for 144 optical fibers being much greater than the outside diameter of the microcable 1, which is typically 2.0 mm for twelve optical fibers, the external retaining sheath 11 and the external layer 12 of the minicable 9 are generally thicker than the retaining sheaths 3 of the optical fiber modules 10 and the external layer 4 of the microcable 1. The thickness of the retaining sheath 11 or the external layer 12 is typically from approximately 0.10 mm to approximately 0.50 mm.

A filling material 13 may fill all of the space inside the minicable 9 between the modules 10 and the retaining sheath 11, the modules 10 being coated with the material 13 before they are passed through a die for extruding the retaining sheath 11 and the external layer 12. The filling material 13 is a sealing product, such as a silicone or synthetic gel, oil or grease. The retaining sheaths 3 of the modules 10 are coated with the sealing product 13 before they are passed through a die for simultaneously extruding the external layer 12 and the retaining sheath 11 around the modules 10. The retaining sheath 11 and the external layer 12 are preferably produced at the same time as drawing and assembling the modules 10 and therefore simultaneously with drawing and assembling the optical fibers of each module. The modules 10 may be SZ twisted so that all the modules have the same length and are stressed homogeneously by mechanical stresses, such as curvatures in particular.

Nevertheless, in other variants, the filling material 13, like the filling material 7 in a sheath 3 of a module 10 or a microcable 1, is applied "dry" in the form of a powder and/or a thread and/or a tape that swell up in the presence of water to form a plug. The plug prevents the propagation of water, firstly, between the optical fibers 2 inside the retaining sheath 3 of each module 10 or microcable 1 and, secondly, between the modules 10 inside the retaining sheath 11 of the minicable 9.

In a manner analogous to the covering 6 of an optical fiber 2 in a retaining sheath 3 or to a retaining sheath 3 of a module 10, the external layer 4 of the microcable 1 or the external layer 12 of the minicable 9 may comprise identification means for identifying the microcable or minicable and distinguishing it from other microcables or minicables. The identification means comprises, for example, an external identification colored film covering fixed to the external layer 4, 12 or integrated into the external layer 4, 12. The identification means may comprise one or more threads or tapes having predetermined different colors and extending longitudinally or helicoidally along the external layer 4, 12. These external threads or tapes may be extruded at the same time as the external layer 4, 12 or be printed, for example with one or more different indelible inks or paints on the external layer.

In another embodiment, the identification means of the microcable or the minicable 9 comprises a mark or symbol that is made up of alphanumeric characters marked on the external layer 4, 12, preferably periodically and longitudinally and/or helicoidally. These markings are preferably fluorescent to make them more visible in low light.

In a further embodiment, the material of the external layer 4, 12 is translucent, for example a translucent polyamide or a translucent polyester. Markings such as one or more threads, tapes, marks or symbols are printed in ink on the retaining sheath 3, 11 surrounded by the external layer and are visible through the external layer 4, 12. The resulting ink markings are therefore resistant to abrasion.

While in accordance with the provisions of the Patent Statutes the preferred form and embodiments of the invention have been illustrated and described, it will be apparent to those skilled in the art that changes and modifications may be made without deviating from the inventive concepts set forth above.

What is claimed is:

1. A telecommunication cable, comprising:
   (a) a plurality of optical fibers,
   (b) a thin retaining sheath extending concentrically about said optical fibers, and
   (c) a tubular external layer extending concentrically around said retaining sheath, said external layer having a coefficient of friction lower than that of said retaining sheath,
   (d) said cable having a stiffness greater than approximately $2.6\times10^{-3}$ N.m$^2$ where N equals the number of optical fibers.

2. A cable according to claim 1, wherein the coefficient of friction of the external layer is less than approximately 0.060.

3. A cable according to claim 1, wherein the external layer has a stiffness greater than the stiffness of the retaining sheath.

4. A cable according to claim 1, wherein the external layer is mechanically coupled to the retaining sheath surrounded by the external layer.

5. A cable according to claim 1, wherein at least one of the following characteristics of the external layer is greater than that of the retaining sheath surrounded by the external layer: Young's modulus in tension, Young's modulus in flexion, coefficient of expansion/compression and hardness.

6. A cable according to claim 1, wherein the external layer is thinner than the retaining sheath.

7. A cable according to claim 1, wherein the thickness of the external layer lies between approximately 0.02 mm to approximately 0.10 mm.

8. A cable according to claim 1, wherein the retaining sheath and the external layer are extruded around the optical fibers.

9. A cable according to claim 1, wherein the external layer and the retaining sheath are produced simultaneously with drawing and assembling the optical fibers.

10. A cable according to claim 1, comprising a plurality of retaining sheaths that each clamp by mechanical coupling a respective module comprising a plurality of optical fibers, a retaining sheath mechanically coupled to said plurality of retaining sheaths, and an external layer surrounding said mechanically coupled retaining sheet and having a coefficient of friction lower than that of said mechanically coupled retaining sheath.

11. A cable according to claim 10, wherein the external layer and said mechanically coupled retaining sheath are each thicker than the retaining sheaths of the optical fiber modules.

12. A cable according to claim 10, wherein the thickness of the external layer is from approximately 0.10 mm to approximately 0.50 mm.

13. A cable according to claim 10, wherein the external layer and the retaining sheath surrounded by the external layer are extruded around the modules.

14. A cable according to claim 10, wherein the external layer and the retaining sheath are formed at the same time as the drawing and assembling of the modules.

15. A cable according to claim 1, comprising a plurality of colored threads of different colors arranged on the external layer for identifying the cable.

16. A cable according to claim 1, comprising markings applied periodically to the external layer to identify the cable.

17. A telecommunication cable, comprising:
(a) a plurality of optical fibers,
(b) a thin retaining sheath extending concentrically about said optical fibers, and
(c) a tubular external layer extending concentrically around said retaining sheath, said external layer having a coefficient of friction lower than that of said retaining sheath, said cable having a stiffness of greater than $1053\ DE^2 - 1.6\times10^{-3} N.m^2$, wherein DE denotes the outside diameter of said external layer, and N equals the number of optical fibers.

18. A telecommunication cable, comprising:
(a) a plurality of optical fibers,
(b) a thin retaining sheath extending concentrically about said optical fibers, and
(c) a tubular external layer extending concentrically around said retaining sheath, said external layer having a coefficient of friction lower than that of said retaining sheath, said external layer having at least one of the following physical characteristics: a Young's modulus in tension lying between approximately 40 MPa to approximately 100 MPa, a coefficient of expansion/compression lying between approximately $100\times10^{-6}/°$C. and approximately $300\times10^{-6}/°$ C., a Young's modulus in flexion lying between approximately 800 MPa and approximately 2500 MPa, and a hardness greater than approximately 80 Shore D units.

19. A telecommunication cable, comprising:
(a) a plurality of optical fibers,
(b) a thin retaining sheath extending concentrically about said optical fibers, and
(c) a tubular external layer extending concentrically around said retaining sheath, said external layer having a coefficient of friction lower than that of said retaining sheath,
(d) said external layer being translucent to permit the viewing of markings on the retaining sheath surrounded by the external layer.

* * * * *